US010982720B2

(12) United States Patent
Hautecoeur et al.

(10) Patent No.: US 10,982,720 B2
(45) Date of Patent: Apr. 20, 2021

(54) DEVICE FOR CONNECTING AN END OF A FIRST SHAFT TO AN END OF A SECOND SHAFT, AND ASSOCIATED TRANSMISSION ASSEMBLY

(71) Applicant: SAFRAN ELECTRONICS & DEFENSE, Boulogne-Billancourt (FR)

(72) Inventors: Julien Hautecoeur, Boulogne-Billancourt (FR); Mathieu Rousselet, Boulogne-Billancourt (FR); Vincent Pascal, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 16/493,581

(22) PCT Filed: Mar. 13, 2018

(86) PCT No.: PCT/EP2018/056162
§ 371 (c)(1),
(2) Date: Sep. 12, 2019

(87) PCT Pub. No.: WO2018/167013
PCT Pub. Date: Sep. 20, 2018

(65) Prior Publication Data
US 2020/0378447 A1 Dec. 3, 2020

(30) Foreign Application Priority Data
Mar. 13, 2017 (FR) ...................................... 1752028

(51) Int. Cl.
*F16D 1/116* (2006.01)
*B64C 13/30* (2006.01)
(Continued)

(52) U.S. Cl.
CPC .............. *F16D 1/116* (2013.01); *B64C 13/30* (2013.01); *F16D 3/387* (2013.01); *F16D 2001/103* (2013.01); *Y10T 403/7033* (2015.01)

(58) Field of Classification Search
CPC .............. Y10T 403/7033; F16D 1/116; F16D 2001/103; F16D 3/387; B34C 13/30; B64C 13/30
See application file for complete search history.

(56) References Cited

U.S. PATENT DOCUMENTS 2,448,278 A    8/1948  Ronning
3,992,119 A   11/1976  Recker
(Continued)

FOREIGN PATENT DOCUMENTS

DE    929998 C   *  7/1955  ............. F16D 3/387
FR    2858289 A1    2/2005
GB    938145 A   * 10/1963  ............. F16B 21/12

OTHER PUBLICATIONS

International Preliminary Report on Patentability received for PCT Patent Application No. PCT/EP2018/056162, dated Sep. 26, 2019, 14 pages (7 pages of English Translation and 7 pages of Original Document).

(Continued)

*Primary Examiner* — Matthew R McMahon
(74) *Attorney, Agent, or Firm* — Womble Bond Dickinson (US) LLP

(57) ABSTRACT

A device (1) for connecting an end of a first shaft to an end of a second shaft, the end of the first shaft having a radial groove. The device includes a body (2) having a bore (21) into which the end of the first shaft can be introduced, a locking pin (3) movable with respect to the body (2) between a locked position, in which the pin (3) projects into the bore (21) such that, when the end of the first shaft is received inside the bore (21), the locking pin (3) is engaged in the (Continued)

radial groove in the end of the first shaft, and an unlocked position. In the unlocked position, the locking pin (3) is disengaged from the radial groove in the end of the first shaft, and an elastic return member (4) urges the locking pin (3) into the locked position.

14 Claims, 7 Drawing Sheets

(51) Int. Cl.
    *F16D 3/38*     (2006.01)
    *F16D 1/10*     (2006.01)

(56) References Cited

U.S. PATENT DOCUMENTS

| | | | | |
|---|---|---|---|---|
| 4,125,337 A * | 11/1978 | Recker | ............... | F16D 3/387 403/11 |
| 4,339,212 A * | 7/1982 | Sauber | ............... | F16B 2/14 403/27 |
| 4,645,368 A * | 2/1987 | Simpson | ............... | F16D 1/116 403/9 |
| 4,687,367 A * | 8/1987 | Bondioli | ............... | F16D 1/116 403/322.1 |
| 6,238,295 B1 * | 5/2001 | Bondioli | ............... | F16D 1/116 403/93 |
| 8,187,107 B2 * | 5/2012 | Huis | ............... | F16D 1/10 464/134 |
| 2010/0120545 A1 | 5/2010 | Huis | | |

OTHER PUBLICATIONS

International Search Report and Written Opinion received for PCT Patent Application No. PCT/EP2018/056162, dated Jun. 15, 2018, 16 pages (7 pages of English Translation and 9 pages of Original Document).

Preliminary Research Report received for French Application No. 1752028, dated Oct. 25, 2017, 3 pages (1 page of French Translation Cover Sheet and 2 pages of original document).

* cited by examiner

State of the art

State of the art

DEVICE FOR CONNECTING AN END OF A FIRST SHAFT TO AN END OF A SECOND SHAFT, AND ASSOCIATED TRANSMISSION ASSEMBLY

FIELD OF THE INVENTION

The invention relates to a device for connecting one end of a first shaft to one end of a second shaft, and a transmission assembly comprising such a connection device.

STATE OF THE ART

Figure 1:
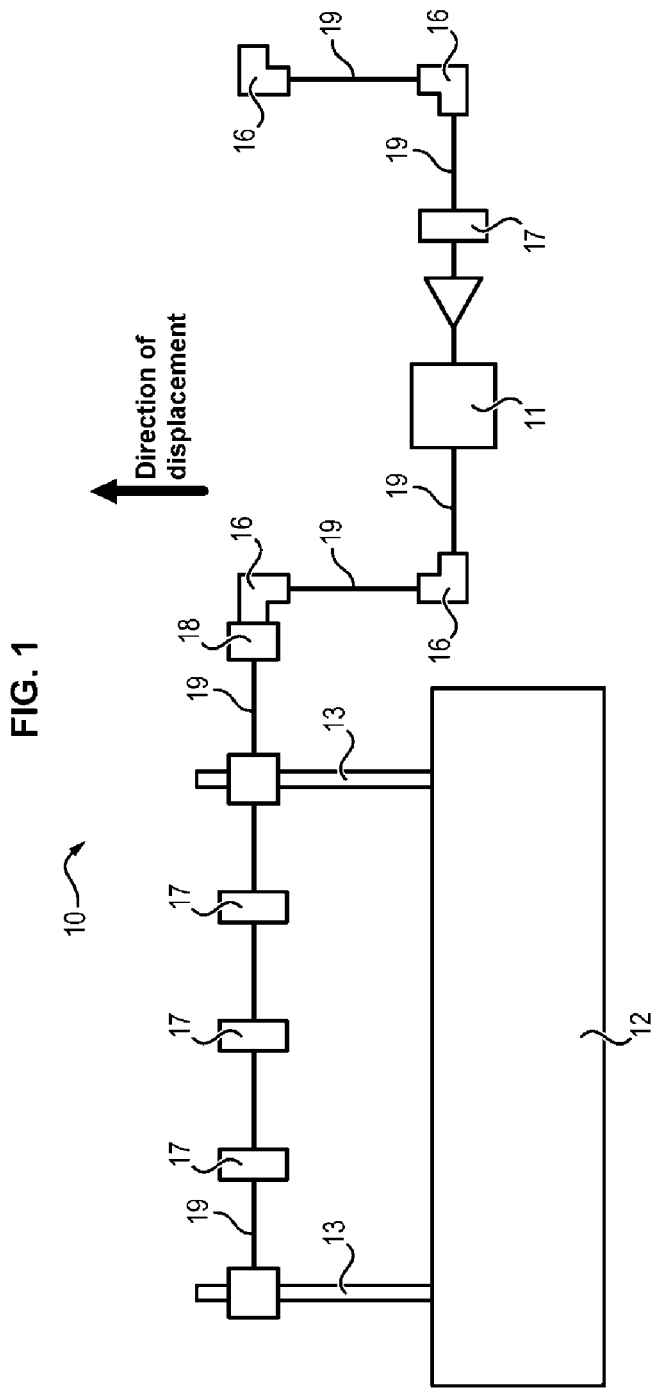

FIG. 1 represents schematically an example of a transmission assembly 10 for transmitting a movement of a motor 11 to a flight control surface 12, such as a high-lift flap for example.

Such an assembly 10 makes it possible to mechanically synchronize the flight control surfaces therebetween. For this purpose, the transmission assembly 10 connects the motor 11 to the various actuators 13 for moving the flight control surfaces.

The transmission assembly 10 generally comprises reduction or angle transmission mechanisms 16, shaft support bearings 17, a torque limiter 18 and a plurality of telescopic transmission shafts 19 connecting the different mechanisms together.

In order to connect the transmission shafts 19 to the various reduction or angle transmission mechanisms or to the other mechanisms, the transmission shafts are provided at their ends with specific connection devices. The input and output shafts of the mechanisms have male splined ends adapted to be engaged in complementary splined bores of the connection devices.

Figure 2:
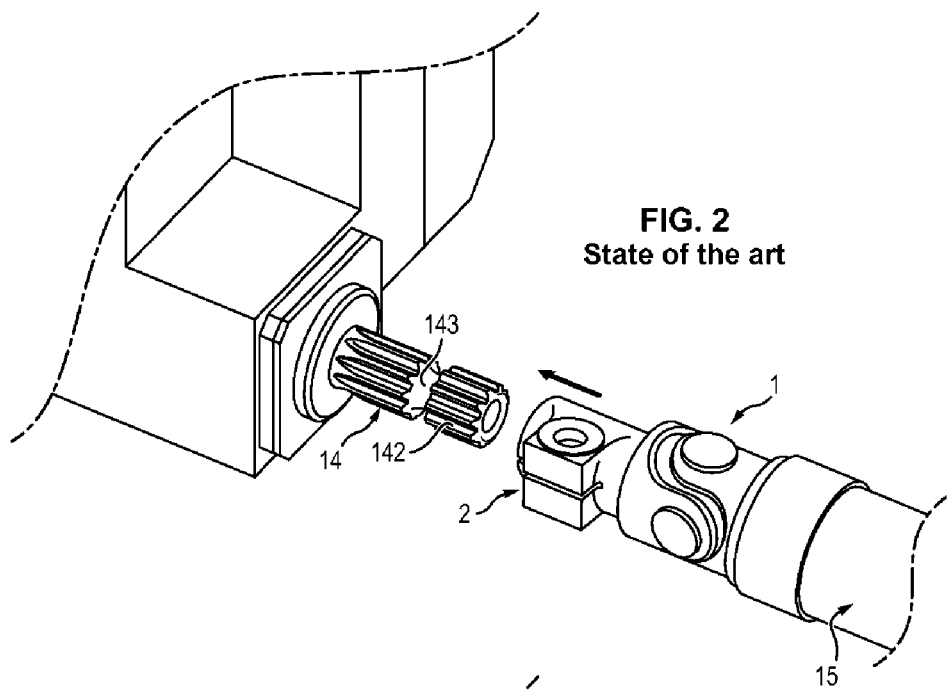
Figure 3:
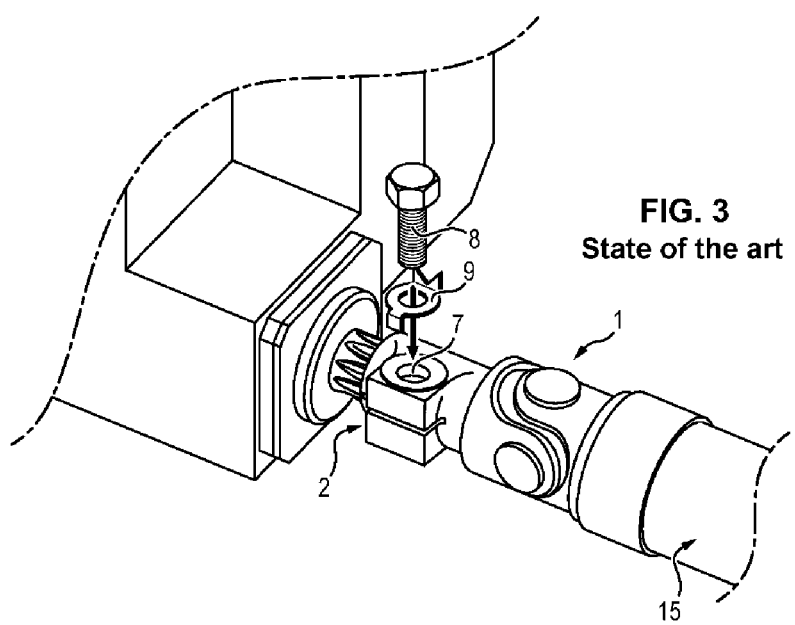

FIGS. 2 and 3 illustrate steps of connecting one end of a first shaft 14 (input or output shaft of a reduction mechanism) to one end of a second shaft 15 (telescopic transmission shaft) using such a connection device 1.

The first shaft 14 has a male end 141 with longitudinal splines 142 and a radial groove 143. The connection device 1 is fastened to the end of the second shaft 15. The connection device 1 comprises a body 2 having a bore in which the end of the first shaft can be introduced. The bore is provided with longitudinal splines adapted to cooperate with the longitudinal splines 142 of the male end of the first shaft 14 to transmit a rotational movement of the second shaft 15 to the first shaft 14. The body 2 of the connection device 1 further comprises a threaded orifice 7 extending transversely to the bore and adapted to receive a locking screw 8.

As illustrated in FIG. 2, the male end 141 of the first shaft 14 is inserted into the splined bore of the connection device 1.

Then, as illustrated in FIG. 3, the connection device 1 is locked on the first shaft 14 by means of the screw 8 and of a blocking washer 9. The screw 8 is screwed into the threaded orifice 7. The threaded orifice 7 is arranged so that, when the screw 8 is screwed into the threaded orifice 7, the rod of the screw 8 extends in the radial groove 143 of the end 141 of the first shaft 14, so as to prevent removal of the end 141 of the first shaft 14 from the body 2 of the connection device 1.

A disadvantage of such a connection device is that, in case of jamming of one of the components of the transmission assembly 10, the shafts can be immobilized in a position in which it is difficult or impossible to access to the screw using a tool, in order to unlock the connection device.

In such a situation, it may be necessary to disassemble a very large number of parts of the transmission mechanism in order to access to the damaged equipment or even cut off some transmission shafts.

SUMMARY OF THE INVENTION

An object of the invention is to propose a connection device for easy locking and unlocking, without the use of a tool.

This object is achieved within the context of the present invention by means of a device for connecting one end of a first shaft to one end of a second shaft, the end of the first shaft having a radial groove, the device comprising:
  a body having a bore in which the end of the first shaft can be introduced, and an oblong opening,
  a blocking pin movably mounted relative to the body between a locked position, in which the pin protrudes inside the bore so that, when the end of the first shaft is received inside the bore, the blocking pin is engaged in the radial groove of the end of the first shaft to prevent removal of the end of the first shaft from the bore, and an unlocked position, in which the blocking pin is disengaged from the radial groove of the end of the first shaft to allow introduction of the end of the first shaft into the bore or removal of the end of the first shaft from the bore,
  an elastic return member adapted to urge the blocking pin toward the locked position, and
  an actuating part extending outside the body and connected to the blocking pin, the actuating part being adapted to be manually urged by an operator for moving the blocking pin from the locked position to the unlocked position against the elastic return member,
wherein the actuating part comprises a slider extending through the oblong opening, the slider being adapted to slide in the oblong opening for moving the blocking pin between the locked position and the unlocked position.

In such a device, the blocking pin is held in the locked position by means of the elastic return member. Thus, the unlocking of the blocking pin can be obtained simply by pulling the pin toward the unlocked position, against the elastic return member. In this way, the locking and unlocking of the connection device does not require the use of a tool and can be achieved regardless of the position in which the shafts are stopped.

The proposed connection device also has the advantage of being suitable for connecting shafts having standard splined ends.

The proposed device may further have the following characteristics:
  the blocking pin is slidably mounted in translation on the body,
  the blocking pin has a lateral notch which, when the blocking pin is in the unlocked position, is aligned with the bore so as to allow introduction of the end of the first shaft into the bore or removal of the end of the first shaft from the bore,
  the body has a guide orifice inside which the blocking pin extends and in which the blocking pin can slide, the guide orifice extending substantially transversely to the bore and opening into the bore,
  the elastic return member is a spring, the spring being disposed so that it is compressed when the blocking pin is moved toward the unlocked position,
  the spring extends inside the guide orifice, the body comprises a flattened portion having a flat surface and the slider extends beyond the flat surface so that it can be manually grasped by an operator, the body comprises a flattened portion having a flat surface and the actuating part comprises a plate in contact with the flat surface and adapted to slide along the flat surface, the flat surface of the flattened portion is coated with a colored layer having a different color from that of the rest of the body, the colored layer being masked by the plate when the blocking pin is in the locked position and uncovered when the blocking pin is in the unlocked position so as to be visible to an operator, the slider has a central bore, and comprising a screw extending inside the central bore to fasten the actuating part to the blocking pin;

the pin has a lateral recess adapted to receive one end of the slider, the recess has a face extending in a plane substantially transverse to a direction of displacement of the blocking pin, and the end of the slider has a face disposed in contact with the face of the recess for driving the blocking pin from the locked position to the unlocked position, the blocking pin extends entirely inside the guide orifice in the locked position.

The invention further relates to a transmission assembly for transmitting a movement of a motor to a flight control surface, comprising:

a first shaft having one end with a radial groove, a second shaft, and a connection device as defined above, in which the body is mounted secured to one end of the second transmission shaft, for connecting the first transmission shaft to the second transmission shaft.

PRESENTATION OF THE DRAWINGS

Figure 4:
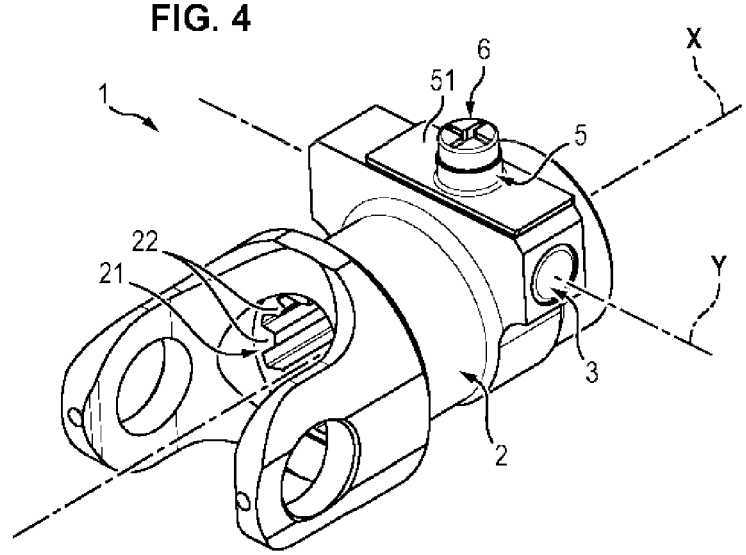
Figure 5:
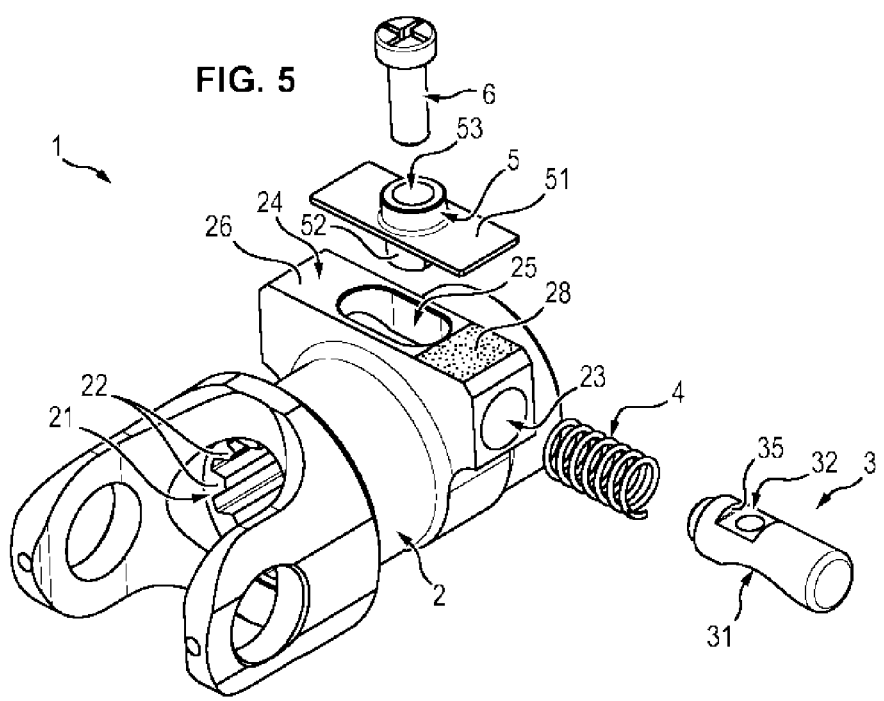
Figure 6A:
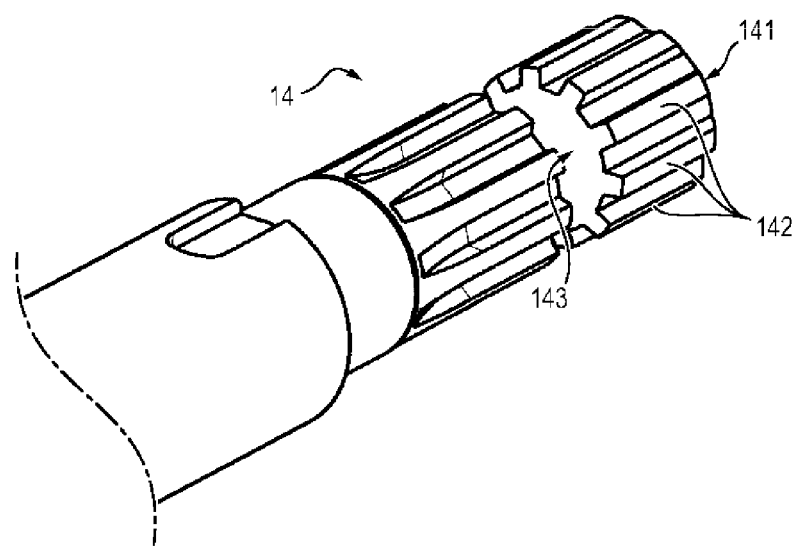
Figure 6B:
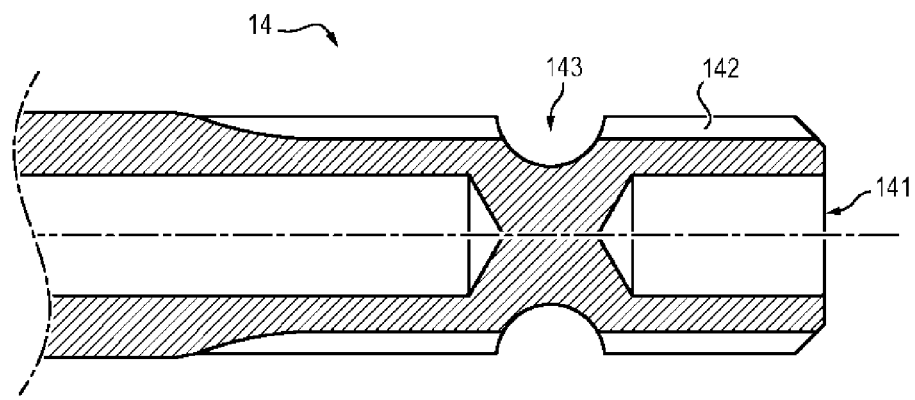
Figure 7:
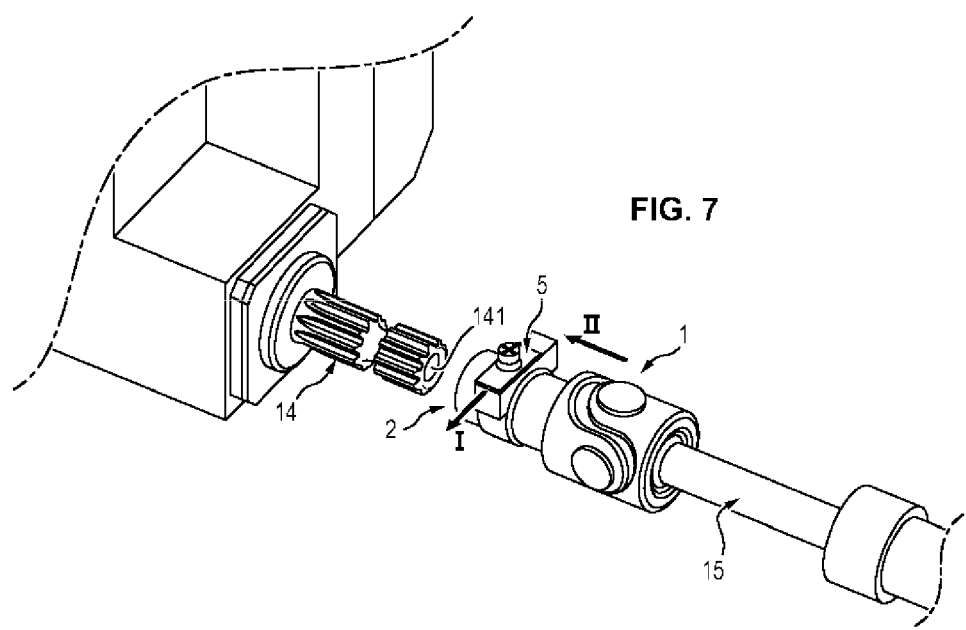
Figure 8:
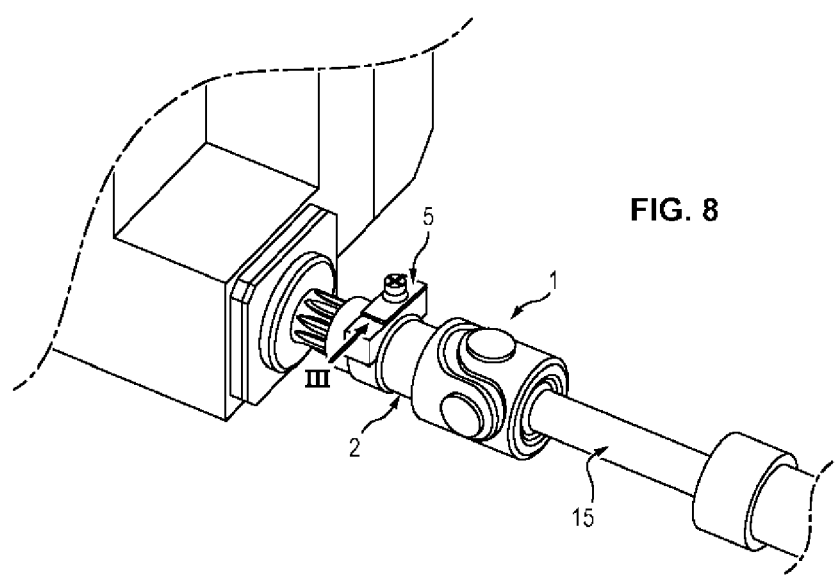
Figure 9:
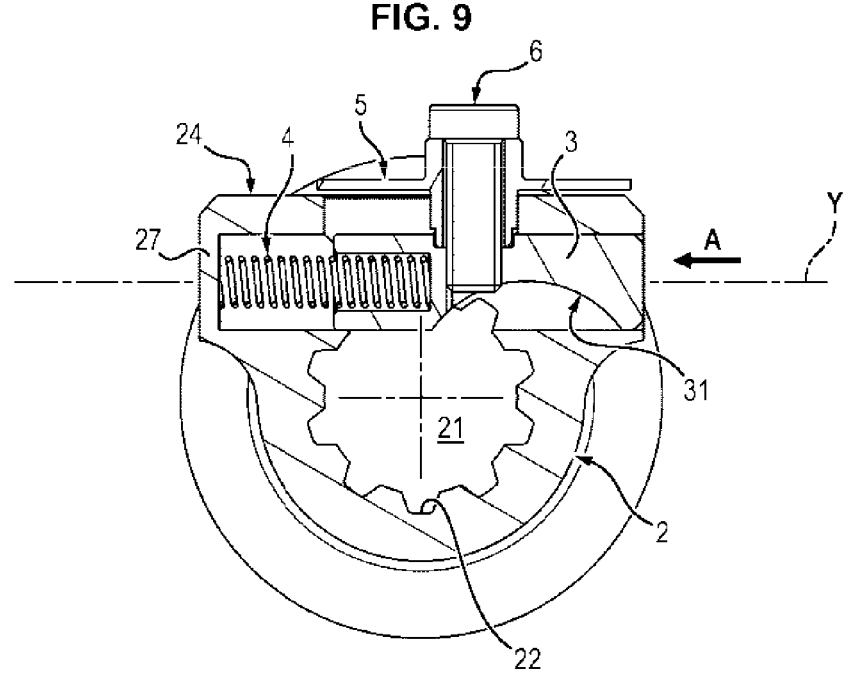
Figure 10:
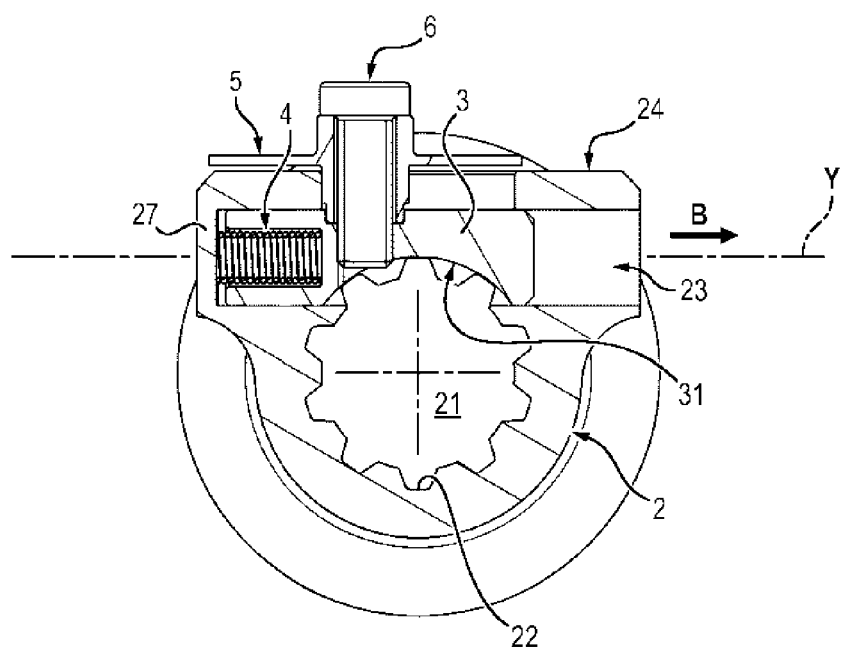
Figure 11:
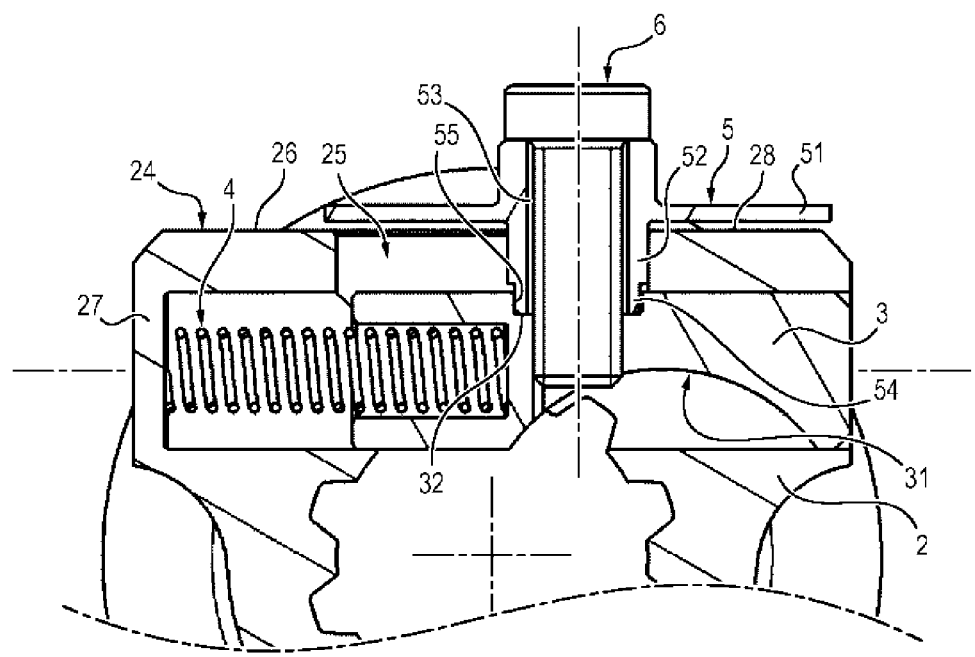

Other characteristics will emerge from the following description, which is purely illustrative and non-restrictive, and should be read in relation with the appended figures, among which:

FIG. 1 schematically represents a transmission assembly for transmitting a movement of a motor to a flight control surface, FIGS. 2 and 3 illustrate steps of connecting one end of a first shaft to one end of a second shaft, using a connection device according to the state of the art, FIGS. 4 and 5 schematically represent a connection device according to one embodiment of the invention, FIGS. 6A and 6B schematically represent one end of a first transmission shaft, FIGS. 7 and 8 schematically represent steps of connecting one end of the first shaft to one end of a second shaft, using the connection device in FIGS. 4 and 5, FIGS. 9 and 10 schematically represent in cross section, the locking device when the blocking pin is in the locked position and when the blocking pin is in the unlocked position respectively, FIG. 11 schematically represents, in cross section, the blocking pin and the actuating part.

DETAILED DESCRIPTION OF ONE EMBODIMENT

In FIGS. 4 and 5, the represented connection device 1 comprises a body 2, a blocking pin 3, an elastic return member 4, an actuating part 5 and a fastening screw 6.

The body 2 has a bore 21 in which the end of the first shaft can be introduced. The bore 21 has a plurality of longitudinal splines 22, extending along a longitudinal direction X, parallel to a direction of insertion of the end of the first shaft into the bore 21.

The body 2 further comprises a guide orifice 23 extending substantially transversely to the bore 21 and opening into the bore 21. The guide orifice 23 extends along a direction Y, orthogonal to the direction X of insertion of the end of the first shaft into the bore 21.

The guide orifice 23 is adapted to receive the blocking pin 3.

The body 2 further has a flattened portion 24 and an oblong opening 25. The flattened portion 24 forms a flat surface 26 extending parallel to the Y axis of the guide orifice 23. The oblong opening 25 is formed through the flat surface 26 and opens into the guide orifice 23. The oblong opening 25 has an elongate shape along a direction parallel to the Y axis of the guide orifice 23.

The elastic return member 4 and the blocking pin 3 extend inside the guide orifice 23.

The blocking pin 3 is able to slide inside the guide orifice 23 along a sliding direction parallel to the Y axis of the guide orifice 23.

More specifically, the blocking pin 3 is slidably mounted in translation inside the guide orifice 23 between a locked position (illustrated schematically in FIG. 9) and an unlocked position (illustrated schematically in FIG. 10).

As can be seen in FIGS. 9 and 10, both in the locked position and in the unlocked position, the blocking pin 3 extends completely inside the guide orifice 23.

The blocking pin 3 has a lateral notch 31. The lateral notch 31 forms a recess in the pin 3, the recess having a cylindrical surface of revolution with a radius substantially equal to the radius of the bore 21 of the body 2.

When the blocking pin 3 is in the locked position (FIG. 9), the notch 31 is offset relative to the bore 21 and the blocking pin 3 protrudes inside the bore 21. Thus, when the end of the first shaft is received inside the bore 21, the blocking pin 3 is engaged in the radial groove of the end of the first shaft to prevent removal of the end of the first shaft from the bore.

When the blocking pin 3 is in the unlocked position (FIG. 10), the notch 31 is aligned with the bore 21 so as to allow introduction of the end of the first shaft into the bore 21 or removal of the end of the first shaft from the bore 21.

The elastic return member 4 is arranged so as to exert on the blocking pin 3 a restoring force tending to return the pin 3 into the locked position. The elastic return member 4 is a spring, for example a helical spring. The elastic return member 4 is arranged between a bottom wall 27 of the orifice 23 and the blocking pin 3. Preferably, the elastic return member 4 is disposed so that it is compressed when the blocking pin 3 is moved toward the unlocked position.

The actuating part 5 is adapted to be manually urged by an operator for moving the blocking pin 3 from the locked position to the unlocked position against the elastic return member 4.

As illustrated in FIGS. 4 and 5, the actuating part 5 comprises a plate 51 and a slider 52.

The actuating part 5 extends partly outside the body 2 and partly inside the guide orifice 23.

As illustrated in FIG. 11, the actuating part 5 is fastened to the blocking pin 3 via the fastening screw 6.

More specifically, the slider 52 extends through the oblong opening 25. The slider 52 extends beyond the flat surface 26 so that it can be manually grasped by an operator.

The slider 52 is adapted to slide in the oblong opening 25 for moving the blocking pin 3 between the locked position and the unlocked position.

The slider 52 has a central bore 53, the fastening screw 6 extending inside the central bore 53 to fasten the actuating part 5 to the blocking pin 3.

Furthermore, the blocking pin 3 has a lateral recess 32 adapted to receive one end 54 of the slider 52. The lateral recess 32 has a face 35 extending in a plane substantially transverse to the sliding direction Y of the blocking pin 3, and the end 54 of the slider has a face 55 disposed in contact with the face 35 of the recess for driving the blocking pin 3 from the locked position to the unlocked position.

The plate 51 is disposed in contact with the flat surface 26 of the flattened portion 24 and is adapted to slide along the flat surface 26. The flat surface 26 of the flattened portion is coated with a colored layer 28 having a color different from that of the rest of the body 2. When the blocking pin 3 is in the locked position, the colored layer 28 is masked by the plate 51. When the blocking pin 3 is in the unlocked position, the colored layer 28 is uncovered so as to be visible to an operator. In this way, the operator can make sure that the blocking pin 3 is in the locked position.

FIGS. 6A and 6B schematically represent one end 141 of the first shaft 14.

As illustrated in these figures, the end 141 of the first shaft 14 comprises a plurality of longitudinal splines 142 extending parallel to a longitudinal direction of the shaft 14, and a radial groove 143 extending transversely to the splines 142, on the circumference of the shaft 14.

When the end 141 of the first shaft 14 is inserted into the bore 21 of the body 2 of the connection device 1, the splines 142 of the end 141 of the first shaft 14 are interposed with the splines 22 of the bore 21 of the body 2 of the connection device 1. In this way, the end 141 of the first shaft 14 is secured in rotation to the body 2 of the connection device 1. In addition, the radial groove 143 is adapted to receive the blocking pin 3 for locking the end 141 of the first shaft 14 inside the body 2.

FIGS. 7 and 8 schematically represent steps of connecting the end 141 of the first shaft 14 to one end of a second shaft 15. The first shaft 14 is for example a transmission shaft and the second shaft is for example an input or output shaft of a mechanism or equipment, such as a reduction mechanism 16 forming part of a transmission assembly 10 in accordance with FIG. 1.

In FIGS. 7 and 8, the connection device 1 is fastened to one of the ends of second shaft 15.

According to a first step I illustrated in FIG. 7, the blocking pin 3 is moved from the locked position to the unlocked position. For this purpose, the operator grasps the actuating part 5 and moves the actuating part 5 with respect to the body 2, thereby causing a displacement of the blocking pin 3 inside the guide orifice 23 from the locked position to the unlocked position (arrow A in FIG. 9). The displacement of the blocking pin 3 from the locked position to the unlocked position against the elastic return member 4 has the effect of compressing the elastic return member 4.

According to a second step II, while the operator holds the blocking pin 3 in the unlocked position, he/she inserts the end 141 of the first shaft 14 into the bore 21 of the body 2 of the connection device 1.

According to a third step III illustrated in FIG. 8, the blocking pin 3 is moved from the unlocked position to the locked position. For this purpose, the operator releases the actuating part 5 so that the elastic return member 4 returns the blocking pin 3 from the unlocked position to the locked position (arrow B in FIG. 10). The displacement of the blocking pin 3 from the unlocked position to the locked position has the effect of relaxing the elastic return member 4.

Once in the locked position, the blocking pin 3 is engaged in the radial groove 143 of the end of the first shaft. In this position, the blocking pin 3 prevents removal of the end 141 of the first shaft 14 from the bore 21. In addition, the elastic return member 4 holds the blocking pin 3 in the locked position.

In order to separate the first shaft 14 from the second shaft 15, it is sufficient for the operator to perform the reverse steps. The operator manually grasps the actuating part 5 and moves it again with respect to the body 2 in the direction of the arrow A, so as to slide the blocking pin 3 inside the guide orifice 23 from the locked position to the unlocked position. While the operator holds the blocking pin 3 in the unlocked position, he/she removes the end 141 of the first shaft 14 from the bore 21. Then, the operator releases the actuating part 5 so that the elastic return member 4 returns the blocking pin 3 from the unlocked position to the locked position.

Thus, disassembly of the first shaft 14 can be achieved easily, regardless of the position of the first shaft 14, and does not require tools.

The invention claimed is:

1. A device connecting one end of a first shaft to one end of a second shaft, the end of the first shaft having a radial groove, the device comprising:
   a body having a longitudinal bore in which the end of the first shaft can be introduced, and an oblong opening,
   a blocking pin laterally translatable mounted relative to the body between a locked position, in which the blocking pin protrudes into the longitudinal bore so that, when the end of the first shaft is received inside the longitudinal bore, the blocking pin is engaged in the radial groove of the end of the first shaft to prevent removal of the end of the first shaft from the bore, and an unlocked position, in which the blocking pin is disengaged from the radial groove of the end of the first shaft and the longitudinal bore is free of the blocking pin to allow introduction of the end of the first shaft into the longitudinal bore or removal of the end of the first shaft from the bore,
   an elastic return member adapted to urge the blocking pin toward the locked position, and
   an actuating part extending outside the body and connected to the blocking pin, the actuating part being adapted to be manually urged by an operator for moving the blocking pin from the locked position to the unlocked position against the elastic return member,
   wherein the actuating part comprises a slider extending through the oblong opening, the slider being adapted to slide in the oblong opening for moving the blocking pin between the locked position and the unlocked position.

2. The device according to claim 1, wherein the blocking pin is slidably mounted in translation on the body.

3. The device according to claim 1, wherein the blocking pin has a lateral notch which, when the blocking pin is in the unlocked position, is aligned with the bore so as to allow introduction of the end of the first shaft into the bore or removal of the end of the first shaft from the bore.

4. The device according to claim 1, wherein the body has a guide orifice inside which the blocking pin extends and in which the blocking pin can slide, the guide orifice extending substantially transversely to the bore and opening into the bore.

5. The device according to claim 4, wherein the spring extends inside the guide orifice.

6. The device according to claim 4, wherein the blocking pin extends entirely inside the guide orifice in the locked position.

7. The device according to claim 1, wherein the elastic return member is a spring, the spring being disposed so that it is compressed when the blocking pin is moved toward the unlocked position.

8. The device according to claim 1, wherein the body comprises a flattened portion having a flat surface and the slider extends beyond the flat surface so that it can be manually grasped by an operator.

9. The device according to claim 1, wherein the body comprises a flattened portion having a flat surface and the actuating part comprises a plate in contact with the flat surface, and adapted to slide along the flat surface.

10. The device according to claim 9, wherein the flat surface of the flattened portion is coated with a colored layer having a different color from that of the rest of the body, the colored layer being masked by the plate when the blocking pin is in the locked position and uncovered when the blocking pin is in the unlocked position so as to be visible to an operator.

11. The device according to claim 1, wherein the slider has a central bore, and comprising a screw extending inside the central bore to fasten the actuating part to the blocking pin.

12. The device according to claim 1, wherein the blocking pin has a lateral recess adapted to receive one end of the slider.

13. The device according to claim 12, wherein the lateral recess has a face extending in a plane substantially transverse to a direction of displacement of the blocking pin, and the end of the slider has a face disposed in contact with the face of the recess for driving the blocking pin from the locked position to the unlocked position.

14. A transmission assembly for transmitting a movement of a motor to a flight control surface, comprising:
- a first shaft having one end with a radial groove,
- a second shaft, and
- a connection device (1) according to claim 1, in which the body is mounted secured to one end of the second shaft, for connecting the first shaft to the second shaft.

* * * * *